United States Patent [19]

Rogers et al.

[11] Patent Number: 5,723,767
[45] Date of Patent: Mar. 3, 1998

[54] METHOD OF CALIBRATING A WHEEL BALANCER PARAMETER ENTRY DEVICE

[75] Inventors: Frederick J. Rogers, Little Rock; Jean de Bellefeuille, North Little Rock, both of Ark.

[73] Assignee: Snap-on Technologies, Inc., Lincolnshire, Ill.

[21] Appl. No.: 693,738

[22] Filed: Aug. 7, 1996

Related U.S. Application Data

[62] Division of Ser. No. 302,283, Sep. 8, 1994, Pat. No. 5,571, 965.

[51] Int. Cl.$^6$ ............................................. G01M 1/02
[52] U.S. Cl. ................................. 73/1.14; 73/1.75
[58] Field of Search ....................... 73/1 B, 1 E, 462, 73/471, 487, 1.75, 1.14; 33/203.12, 502

[56] References Cited

U.S. PATENT DOCUMENTS

| | | | |
|---|---|---|---|
| 3,741,016 | 6/1973 | Hofmann | 73/462 |
| 4,267,730 | 5/1981 | Churchod et al. | 73/462 |
| 4,341,119 | 7/1982 | Jackson et al. | 73/462 |
| 4,576,044 | 3/1986 | Boni | 73/462 |
| 4,939,941 | 7/1990 | Cellucci et al. | 73/865 |
| 5,172,596 | 12/1992 | Rothamel et al. | 73/462 |
| 5,189,912 | 3/1993 | Quinlan et al. | 73/462 |
| 5,447,064 | 9/1995 | Dreschsler et al. | 73/462 |

FOREIGN PATENT DOCUMENTS 2639384   3/1977   Germany.

*Primary Examiner*—John E. Chapman
*Attorney, Agent, or Firm*—Niro, Scavone, Haller & Niro; Lawrence Cruz

[57] ABSTRACT

A method of calibrating a parameter entry device for a vehicle wheel balancer utilizes a parameter entry device having an elongated rod slideably and rotatably mounted to the balancer in parallel with the rotatable wheel-mounting shaft. A transverse arm having a known length and a wheel contacting tip is connected to the rod. A rotary encoder is coupled to the rod so that when the tip is positioned for measuring wheel components the encoder measures angular displacement. Angular measurements of two known radial positions are used for determining the relative angles between each angle and the rest position of the arm to establish a reference. Using the established reference, measurements for determining radius and diameter of various wheel components can be made.

3 Claims, 1 Drawing Sheet

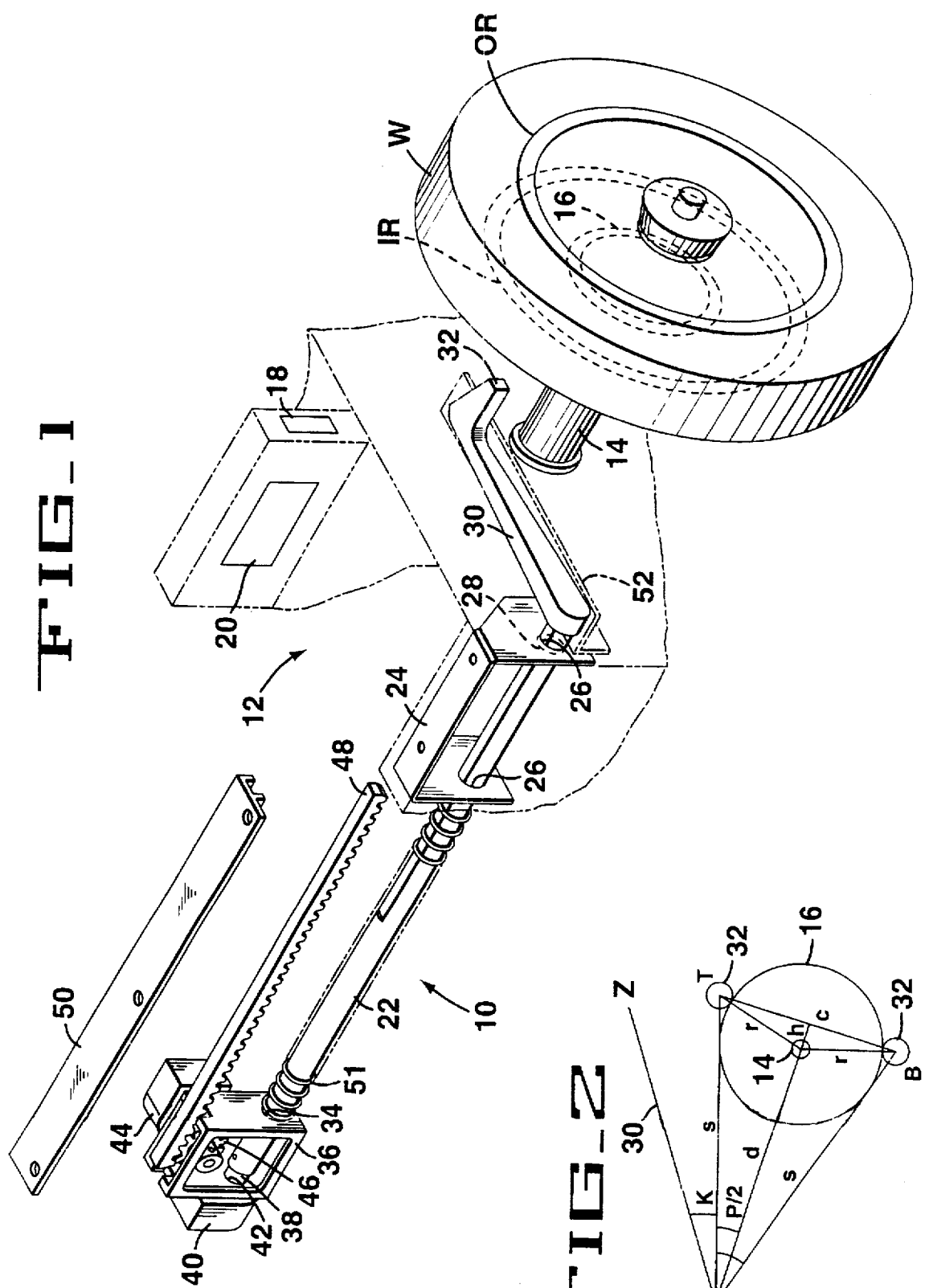

METHOD OF CALIBRATING A WHEEL BALANCER PARAMETER ENTRY DEVICE

This application is a divisional of applicants' application Ser. No. 08/302,283 filed on Sep. 8, 1994, now U.S. Pat. No. 5,571,965.

BACKGROUND OF THE INVENTION

1. Field of the Invention

The present invention relates to an apparatus for balancing rotary bodies, such as the wheels of a motor vehicle. More particularly, the invention relates to a parameter entry device for electronically measuring the parameters of a wheel to be balanced.

2. Description of Related Art

Wheel balancers are well known in the automotive service equipment art. For example, U.S. Pat. No. 4,046,017, which issued to Hill and is owned by the assignee hereof, discloses a motorized wheel balancer comprising a rotatable shaft upon which the wheel to be balanced is mounted and a pair of force transducers positioned adjacent the shaft for measuring the forces imparted to the shaft by the unbalance in the rotating wheel. These wheel balancers typically comprise computer processor means for processing the force transducer outputs to determine the magnitudes and angular positions of the unbalance forces appearing on both the inner and outer rims of the wheel. In order for the processor means to determine the magnitudes of the unbalance forces, certain measurements relating to the wheel to be balanced must be provided, such as the distance between the force transducers and the inner rim of the wheel, which is commonly referred to as offset, and the width and diameter of the rims at the point where the correction weights are to be attached.

Some prior art wheel balancers employ electronic parameter entry devices to aid the operator in measuring the offset and diameter of a wheel to be balanced. These devices typically comprise an elongated rod which is mounted parallel to the rotatable shaft and includes a transverse arm connected to the end of the rod closest the wheel. The rod is both extendible and rotatable to bring the distal end of the arm into contact with the rim of the wheel on which a correction weight will be attached, and electronic means, such as potentiometers, are coupled to the shaft to measure the linear extension and rotation of the shaft, from which the processor means can compute the offset and diameter of the wheel.

The potentiometers used in prior art parameter entry devices are analog devices which can be adversely affected by the normal changes in temperature and humidity experienced in a wheel service station environment. In addition, in wheel balancers employing digital microprocessors as the processor means, additional circuitry must be provided to digitize the output of the potentiometer. Furthermore, parameter entry devices may become out of calibration under the normal, typically rigorous use of the wheel balancer.

SUMMARY OF THE INVENTION

Therefore, it is an object of the present invention to provide a parameter entry device for a wheel balancer which is relatively impervious to changes in temperature and humidity. Another object of the present invention is to provide a parameter entry device which requires no additional circuitry to digitize the output of the device. A further object of the invention is to provide a parameter entry device which may be simply calibrated.

According to the present invention, these and other objects and advantages are achieved by providing a parameter entry device comprising an elongated rod which is slideably and rotatably mounted parallel to the rotatable shaft of the wheel balancer, a transverse arm connected to the end of the rod closest the wheel, a first rotary encoder coupled to the rod for measuring the amount of rotation of the rod, and a second rotary encoder coupled to the rod for measuring the amount of linear extension of the rod. The first and second rotary encoders are preferably optical rotary encoders which are relatively impervious to changes in temperature and humidity. In addition, the rotary encoders generate digital outputs which can be transmitted directly to the processor means without the need for associated digitizing circuitry. The parameter entry device is operated by moving the distal end of the arm into contact with the inner rim of the wheel. The encoders generate digital outputs which are representative of the amount of extension and rotation of the rod. These outputs are transmitted to the processor means, which thereafter calculates the offset and diameter of the wheel using conventionally derived formulas.

The invention also includes a method of calibrating the parameter entry device which comprises moving the distal end of the arm to a first position with respect to the shaft, moving the arm to a second position with respect to the shaft, and returning the arm to a resting position. The distance from the arm to the shaft and the angle from the shaft to the resting position can thus be determined, and these values can be used in subsequent measurements to yield accurate measurements of the offset and diameter of the wheel.

These and other objects and advantages of the present invention will be made apparent from the following detailed description, with reference to the accompanying drawings.

BRIEF DESCRIPTION OF THE DRAWINGS

FIG. 1 is a partial perspective, partial exploded view of the wheel balancer parameter entry device of the present invention; and FIG. 2 is a diagram showing the operation of the calibration feature of the present invention.

DETAILED DESCRIPTION OF THE PREFERRED EMBODIMENTS

Referring to FIG. 1, the parameter entry device according to the present invention, which is indicated generally by reference number 10, is shown incorporated in a wheel balancer 12. Exemplary wheel balancer 12, which can be any of a number of different types of wheel balancers, includes a rotatable shaft 14 upon which a wheel W is mounted for balancing, a backing collar 16 against which wheel W is positioned on shaft 14, a pair of force transducers mechanically coupled to the shaft for measuring the forces imparted to the shaft by the unbalance in the rotating wheel, a computer processor means 18 for processing the force transducer outputs to determine the magnitudes and angular positions of the unbalance forces appearing on both the inner IR and outer OR rims of wheel W, and a video display means 20 for communicating the wheel unbalance information to the operator.

Parameter entry device 10 comprises an elongated rod 22 and a preferably plastic bushing fixture 24 having two aligned apertures 26 into which rod 22 is slideably and rotatably received. Fixture 24 is aligned so that rod 22 is parallel with shaft 14 and is connected to the frame or cabinet of wheel balancer 12 with any appropriate fasteners, such as screws. Rod 22 extends through an opening 28 in the side of wheel balancer 12 near shaft 14. A transverse arm 30 is connected to the end of rod 22 adjacent wheel W. Arm 30 includes a rim-contacting tip 32 for engaging inner rim IR. Thus, rod 22 is extendible toward wheel W and is rotatable to bring tip 32 into contact with inner rim IR.

The end of rod 22 opposite arm 30 extends through an aperture 34 in a box-shaped bracket 36 and engages a shaft 38 of a first rotary encoder 40 extending through an aperture 42, which is in alignment with aperture 34. The end of rod 22 preferably comprises a recess into which shaft 38 extends, and the shaft is connected to rod 22 by any appropriate means, such as a set screw. In this manner, the end of rod 22 is secured to bracket 36, and bracket 36 is supported and carried on rod 22 during extension of rod 22. In addition, the body of rotary encoder 40 is secured to bracket 36 so that rotation of rod 22 will turn shaft 38.

Parameter entry device 10 further comprises a second rotary encoder 44 secured to bracket 36. Rotary encoder 44 includes a shaft which extends through an aperture in bracket 36 and is attached to a preferably plastic gear 46. Gear 46 meshes with a gear rack 48 mounted in a fixture 50, which is connected to the frame or cabinet of wheel balancer 12 by appropriate fasteners in such an orientation that rack 48 is aligned with rod 22. Therefore, extension of rod 22 will cause gear 46 to rotate relative to rack 48 and thereby turn the shaft of rotary encoder 44.

Rotary encoders 40 and 44 are preferably optical encoders which generate a number of digital pulses proportional to the amount of rotation of their shafts. Thus, rotation of arm 30 will cause first rotary encoder 40 to generate a digital output representative of the angle through which arm 30 is rotated. Similarly, extension of rod 22 will cause second rotary encoder 44 to generate a digital output representative of the distance rod 22 is extended.

In operation, an operator grasps arm 30 and brings tip 32 into contact with the lip of inner rim IR. This motion extends rod 22 and rotates arm 30, causing rotary encoders 40 and 44 to generate respective digital outputs representative of the amounts of extension and rotation. The outputs of rotary encoders 40 and 44 are fed to processor means 18, which then automatically computes the offset and diameter of the wheel using conventionally derived formulas. A spring 51 extending between fixture 24 and bracket 36 urges arm 30 back to its resting position, which is depicted in FIG. 1.

Referring now to FIG. 2, a method of calibrating parameter entry device 10 will now be described. FIG. 2 is a representation of the rotation of arm 30 between a position near the top T of backing collar 16 and a position near the bottom B of backing collar 16. These positions form an isosceles triangle PTB having sides s, s and c. During calibration, tip 32 of arm 30 is touched to the top of backing collar 16, then to the bottom of backing collar 16, then back to the resting position indicated by line Z. In the actual resting position, arm 30 is supported on bracket 52 attached to the side of wheel balancer 12 (FIG. 1 ). Since s is the length of arm 30 and the angle P is the angle measured by rotary encoder 40 during movement of tip 32 between T and B, triangle PTB can be solved using the law of cosines to yield the dimension c, as follows:

$$c = sqrt(2s^2 - 2s^2 \cos(P)).$$

From the value of c, the distance d can be determined as follows:

$$(d+h) = sqrt(s^2 - (0.5*c)^2)$$

$$h = sqrt(r^2 - (0.5*c)^2)$$

$$d = (d+h) - h,$$

where r is the radius of backing collar 16, which is a fixed value.

The value d must be known in order to determine the diameter of a wheel from rotation of arm 30. Since this distance may change over time due to wear and other factors, determining d during calibration yields a calibration constant which can be applied in the determination of the wheel diameter. Another calibration constant is the angle (K+P/2) from line d to the normal resting position represented by line Z. This angle is determined by rotary encoder 40 during movement of arm 30 between the two positions on backing collar 16 and the rest position Z. Once determined, the angle K+P/2 and the value d are stored by processor means 18 for use in subsequent determinations of the wheel diameter.

In measuring the diameter of the wheel, the value measured by encoder 40 by touching tip 32 to the lip of the inner rim IR is added to the calibration angle K+P/2 to yield the total angle from line d to the lip. This angle can be solved as follows to yield the rim diameter:

$$\text{rim diameter} = 2*sqrt(s^2 + d^2 - 2sd* \cos(\text{angle } (d \text{ to rim}))).$$

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. A method of calibrating a parameter entry device for a vehicle wheel balancer having a rotatable shaft upon which a wheel to be balanced is mountable and a signal processor means, the parameter entry device including an elongated rod slideably and rotatably mounted to the balancer in parallel with the rotatable shaft, a transverse arm connected to an end of the rod nearest the wheel, the transverse arm comprising a known length and a wheel contacting tip located at the distal end thereof, and a rotary means coupled to the rod for generating a signal representative of the amount of rotation of the arm, the method comprising:

rotating the wheel contacting tip from a rest position to a first position located a known radial distance from the longitudinal centerline of the rotatable shaft;

rotating the wheel contacting tip to a second position located the known radial distance from the longitudinal centerline of the rotatable shaft;

storing a first signal from the rotary means representative of the angle of rotation of the arm between the rest position and the first position;

storing a second signal from the rotary means representative of the angle of rotation of the arm between the first and second positions;

determining an angle between the rest position of the arm and a line connecting the longitudinal centerlines of the rotatable shaft and the rod from the first and second signals;

storing the angle determined in the preceding step for use by the processor means in subsequent determinations of the diameter of the wheel from the angle of rotation of the arm.

2. The method of claim 1, further comprising:

determining the distance between the longitudinal centerline of the rod and the longitudinal centerline of the rotatable shaft from the known length of the arm, the known radial distance and the angle of rotation of the arm between the first and second positions;

storing the distance determined in the preceding step for use by the processor means in subsequent determinations of the diameter of the wheel from the angle of rotation of the arm.

3. The method of claim 1, wherein the wheel balancer comprises a backing collar attached to the rotatable shaft against which the wheel is positioned and the known radial distance is defined as the radius of the backing collar.

* * * * *